United States Patent
Hsieh et al.

(10) Patent No.: US 7,499,124 B2
(45) Date of Patent: Mar. 3, 2009

(54) POLYMER DISPERSED LIQUID CRYSTAL DEVICE CONDITIONED WITH A PREDETERMINED ANCHORING ENERGY, A PREDETERMINED POLYMER CONCENTRATION BY WEIGHT PERCENT AND A PREDETERMINED CELL GAP TO ENHANCE PHASE SEPARATION AND TO MAKE SMALLER AND MORE UNIFORM LIQUID CRYSTAL DROPLETS

(75) Inventors: Pao-Ju Hsieh, Hsinchu (TW); Yi-Hsin Lin, Orlando, FL (US); Hongwen Ren, Orlando, FL (US); Shin-Tson Wu, Orlando, FL (US)

(73) Assignee: Industrial Technology Research Institute, Hsinchu (TW)

( * ) Notice: Subject to any disclaimer, the term of this patent is extended or adjusted under 35 U.S.C. 154(b) by 275 days.

(21) Appl. No.: 11/122,008

(22) Filed: May 5, 2005

(65) Prior Publication Data

US 2006/0250545 A1    Nov. 9, 2006

(51) Int. Cl.
*G02F 1/1333* (2006.01)
(52) U.S. Cl. ...................................................... 349/86
(58) Field of Classification Search ................ 349/86
See application file for complete search history.

(56) References Cited

U.S. PATENT DOCUMENTS

| | | | |
|---|---|---|---|
| 5,790,217 A * | 8/1998 | Lee et al. ....................... | 349/86 |
| 6,072,552 A * | 6/2000 | Komura et al. ................. | 349/86 |
| 6,573,958 B2 * | 6/2003 | Takahashi et al. ............. | 349/86 |
| 6,632,483 B1 * | 10/2003 | Cesare Callegari et al. .. | 427/526 |

* cited by examiner

*Primary Examiner*—David Nelms
*Assistant Examiner*—John Heyman
(74) *Attorney, Agent, or Firm*—Birch, Stewart, Kolasch & Birch, LLP

(57) ABSTRACT

A liquid crystal device includes a pair of substrates with anchoring energy. A cell gap is formed between the pair of substrates. Polymer dispersed liquid crystals are arranged in the cell gap.

15 Claims, 3 Drawing Sheets

POLYMER DISPERSED LIQUID CRYSTAL DEVICE CONDITIONED WITH A PREDETERMINED ANCHORING ENERGY, A PREDETERMINED POLYMER CONCENTRATION BY WEIGHT PERCENT AND A PREDETERMINED CELL GAP TO ENHANCE PHASE SEPARATION AND TO MAKE SMALLER AND MORE UNIFORM LIQUID CRYSTAL DROPLETS

BACKGROUND

The present invention relates a liquid crystal device, and in particular to a polymer dispersed liquid crystal device.

Polymer dispersed liquid crystals (PDLC), consisting of micron-sized LC droplets dispersed in a polymer matrix, are a promising electro-optic material for displays, light switches, and tunable-focus lenses because of their polarization independence. Phase separation, is an important process affecting the electro-optic properties of PDLC. In a conventional PDLC, the formed droplets, each about the size of a visible wavelength, are randomly distributed in the polymer matrix. Typically, the LC and monomer mixture is sandwiched between two indium-tin-oxide (ITO) glasses without any surface treatment. After photo-induced phase separation, the droplets are formed and their sizes vary.

In general, the operation of PDLC depends on the application of voltage. For normal mode PDLC, when a sufficient voltage is applied, the PDLC becomes transparent and allows light to pass, while the PDLC is opaque and scatters light without an applied voltage. For reverse mode PDLC, the transmittance-driving condition is just reversed. In other words, PDLC windows are based on the ability of the nematic director of the liquid crystal droplets to align under an electric field. The PDLC is suitable for an electro-optic material of a light modulation device used in high-brightness projectors, because it exhibits high optical transparency without a polarizer.

However, due to micro-sized LC droplets, a relatively large cell gap is necessary. Besides, liquid crystals are surrounded by polymers, so the operating voltage for initiating liquid crystal becomes relatively high. In general, for different composition substrates, the operating voltage ranges from 10 to 200 V.

SUMMARY

Transmissive and reflective Liquid crystal devices are provided. An embodiment of a Liquid crystal device comprises a pair of substrates with anchoring energy. A cell gap is formed between the pair of substrates and polymer dispersed liquid crystals are arranged in the cell gap.

Another embodiment of a reflective display device comprises a pair of substrates with anchoring energy. The pair of substrates comprises a lower flexible reflective substrate and an upper flexible transparent substrate. A cell gap is formed therebetween and polymer dispersed liquid crystals are arranged therein.

DESCRIPTION OF THE DRAWINGS

The invention can be more fully understood by reading the subsequent detailed description and examples with references made to the accompanying drawings, wherein.

DETAILED DESCRIPTION

Generally, reducing cell gap would lower the operating voltage, however, the contrast ratio may be reduced accordingly. Therefore, providing lower operating voltage while retaining high contrast ratio is a key benefit of the invention.

An embodiment of the invention provides a liquid crystal device with lowered operating voltage while retain high contrast ratio, by providing anchoring energy therein and applying a thin cell gap.

Figure 1:
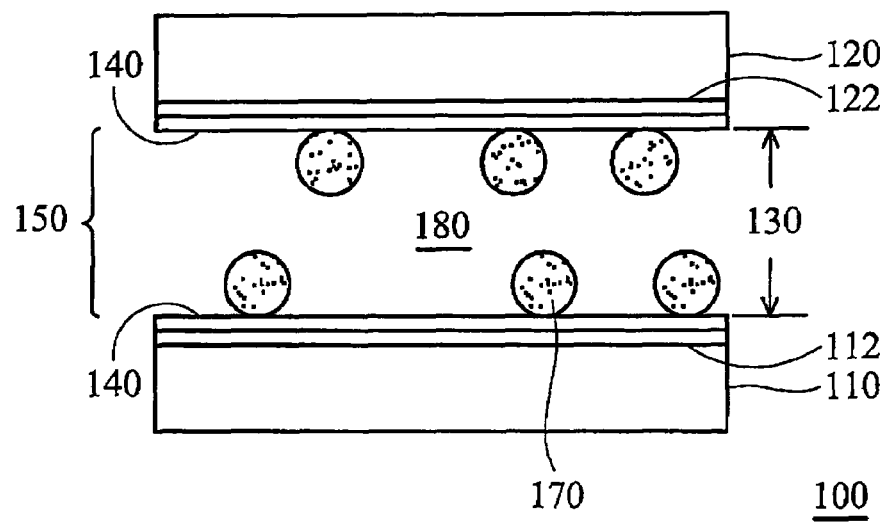
FIG. 1 is a cross section of an embodiment of a transmissive liquid crystal device.

Referring to FIG. 1, the liquid crystal device 100 comprising cells includes a pair of substrates 110 and 120, with anchoring energy. Typically, the pair of substrates further includes conductive layers 112 and 122. Preferably, 112 and 122 are conductive layers, which can be choose from indium-tin-oxide (ITO), indium-zinc-oxide (IZO) or conducting polymers. A cell gap 130 is formed between the pair of substrates 110 and 120. Polymer dispersed liquid crystals (PDLCS) 150 are arranged in the cell gap 130. Typically, the polymer dispersed liquid crystals 150 are formed by dispersing liquid crystal droplets 170 in a polymer material 180 and arranged in the cell gap 130 separating the pair of substrates.

Unlike LC droplet flow and coalescence in the conventional cells, the droplets 170 in the cell gap 130 with PDLCs are anchored. Typically, the anchoring energy is greater than $1 \times 10^{-6}$ J/m$^2$, and preferably between $1 \times 10^{-4}$ J/m$^2$ to $9 \times 10^{-3}$ J/m$^2$. The anchoring energy is provided by one or both inner surfaces of the substrates 110 and 120. Moreover, anchoring energy strength on both of the substrates 110 and 120 may be the same or different.

Due to the relatively strong anchoring energy, for example, $3 \times 10^{-4}$ J/m$^2$ of the surfaces, coalescence of PDLC droplets 170 in the cells with anchoring treatment is impeded. As a result, the droplets 170 size are smaller and more uniform. Hence, the characteristic of high contrast ratio is further improved.

There are many ways to provide anchoring energy, one of which is forming an alignment layer 140 on the one or both inner surfaces of the pair of substrates 110 and 120. Moreover, the alignment layer 140 may be formed by contact alignment treatment. For example, the contact alignment treatment may include rubbing alignment to form an alignment layer 140. Typically, the alignment layer 140 comprises an orientated polyimide (PI) film such as PI-2525 as provided by HD MicroSystems. The alignment layer 140 can further comprises of polyvinyl alcohol or polyamide. The preferred technique for providing an alignment layer is to deposit an alignment film on each transparent substrate, to rub or abrade the film with a gigged, flocked or velvet cloth in a desired direction and, subsequently, clean the film to remove debris left by the rubbing process before assembling the transparent substrates to form cells.

Alignment layer 140 may also be formed by non-contact alignment treatment, such as alignment of oxide evaporation, photo alignment, ion beam alignment, or plasma ion beam alignment.

Preferably, the methods and materials for creating alignment layers include stretching a polymer (Aoyama et al., Mol. Cryst. Liq. Cryst. 72:127(1981)), creating a Langmuir-Blodgett film (Ikeno, et al., Jpn. J. Appl. Phys. 27:L475 (1988)), creating a grating structure by microlithography (Nakamura and Ura, J. Appl. Phys. 52:210 (1981)), depositing SiOx by oblique angle deposition (Ienuing, Appl. Phys. Lett. 21:173 (1982)), and applying polarized UV radiation to a polymer film (Schadt, et al., Jpn. J. Appl. Phys. 31:2155 (1992)).

As shown in FIG. 1, polymer dispersed liquid crystals 150 are formed by dispersing liquid crystal droplets 170 in a polymer material 180, arranged in a cell gap 130 separating the pair of substrates 110 and 120. Generally, the liquid crystal droplets 170 may be of nematic liquid crystal, smectic liquid crystal, cholesteric liquid crystal, ferroelectric liquid crystal, or anti-ferroelectric liquid crystal. Preferably, a twisted nematic liquid crystal with a twisted angle of 90° or a parallel nematic liquid crystal is further included. The liquid crystal droplets 170 may further be positive liquid crystal or negative liquid crystal, and its size is smaller than about 3 μm. For example, the polymer dispersed liquid crystal may comprise Norland Optical Adhesive 65 (NOA65), and an appropriate initiator, the ratio of Norland Optical Adhesive 65 (NOA65) ranging from 25% to 45%. Furthermore, the polymer material 180 of the polymer dispersed liquid crystal 150 may comprise dye materials to increase the contrast ratio.

When the liquid crystal device 100 includes TN PDLC cells, the light scattering behavior of the thin TN PDLC cells is also independent of light polarization because the orthogonal surface alignments influence the LC orientation in the boundary PDLC layers. Furthermore, operating voltage is reduced by arranging PDLC 150 in the thinner cell gap 130. Typically, the cell gap 130 is between about 2 and 50 μm, preferably, between about 4 to 15 μm. 4 to 7 μm is optimum.

Figure 2:
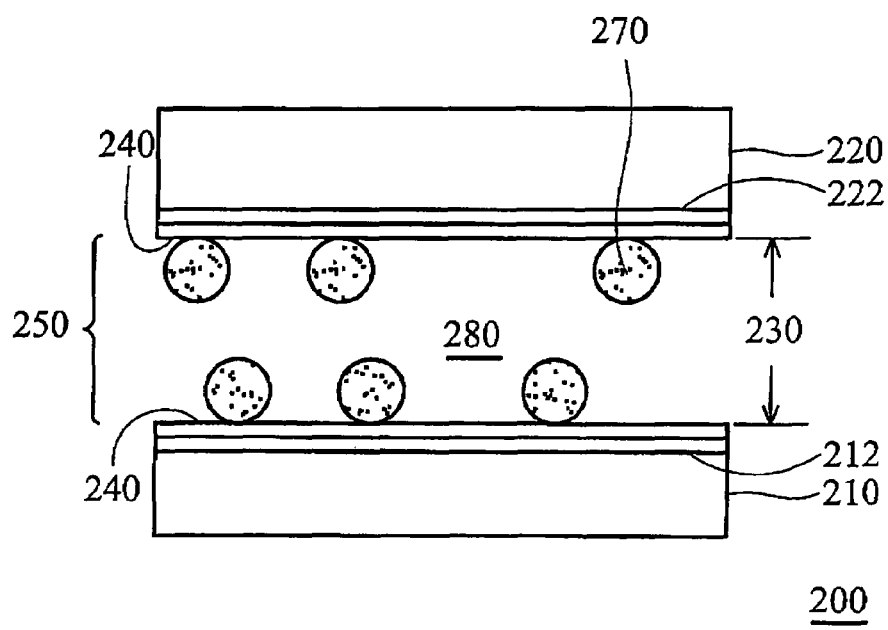
FIG. 2 is a cross section of an embodiment of a reflective display device.

Referring to FIG. 2, the reflective display device 200 includes a pair of substrates with anchoring energy. Typically, the pair of substrates may comprise a lower flexible reflective substrate 210 with a conductive layer 212 and an upper flexible transparent substrate 220 with a conductive layer 222 that are opposed with each other. Preferably, the conductive layer 212 and 222 are indium-tin-oxide (ITO). A cell gap 230 is formed between the lower flexible reflective substrate 210 and the upper flexible transparent substrate 220. Polymer dispersed liquid crystals 250 are arranged in the cell gap 230.

Typically, the dispersed liquid crystals 250 are formed by dispersing liquid crystal droplets 270 in a polymer material 280 and arranged in the cell gap 230 separating the pair of substrates.

Preferably, an alignment layer 240 is formed on the inner surface of the lower flexible reflective substrate 210 or the upper flexible transparent substrate 220, providing anchoring energy.

In a conventional PDLC cell without polyimide alignment layers, LC droplets may flow and coalesce with neighboring droplets. As a result, the final droplets are larger and size distribution is less uniform. In the polymer-dispersed liquid crystal with a thinner cell gap as in devices 100 and 200, the LC droplets are pinned by the strong anchoring force exerted from the surface alignment layers which fix the LC droplets and hinder the coalescence during phase separation. The final morphology in these devices with thin cells and high anchoring energy is more uniform and provides smaller droplets. Such devices may achieve the benefits of high contrast ratio and low operating voltage.

EXAMPLE

In the example, phase separation dynamics influenced by the surface effect of a PDLC confined in a thin cell is demonstrated. The PDLC with strong surface anchoring exhibit smaller LC droplets and better uniformity because the anchoring force in the boundaries fixes droplets and prevents them from flowing and coalescing.

The example uses a liquid crystal device as shown in FIG. 1. To fabricate a PDLC device, UV-curable monomer NOA65 in a nematic LC host (E48, $\Delta n=0.231$ at $\lambda=589$ nm and T=22□) is mixed. Polymer concentration ranges from 20 to 40 wt %. PDLC with 30 wt % NOA65 is used as an example. The LC and monomer mixture is injected into an empty cell in an isotropic state. The cell gap is d=8 μm. Two types of cells with different surface treatment were prepared:

a) a conventional PDLC cell, i.e., glass substrates 110 and 120 with indium-tin-oxide (ITO) layers 112 and 122 without polyimide (PI) alignment layers, b) a 90° twisted nematic (TN) cell, i.e., ITO glass substrates with orthogonal rubbing alignment layers 140, and The polyimide used was PI-2525 (HD Microsystems). A thin PI layer (~800 nm) was spin-coated on the glass substrates and then baked in an oven (250□) for about one hour. For the homogeneous and TN cells, the coated PI substrates were buffed using a rubbing machine. The polar anchoring energy of these homogeneous and TN cells was measured to be about $3\times10^{-4}$ J/m$^2$ by the voltage dependent phase retardation method. The pretilt angle of these PI cells was about 3°.

Figure 3:
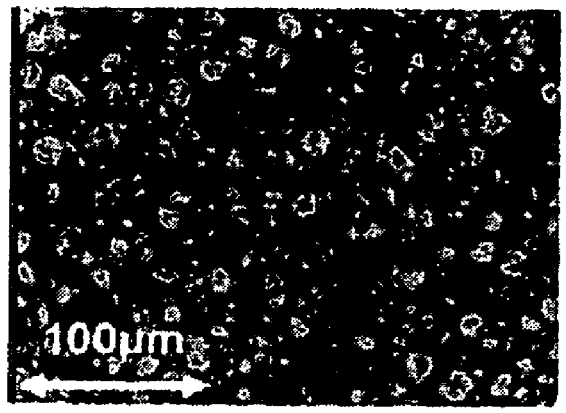
FIG. 3 shows phase separation morphologies of conventional cells observed from a polarized optical microscope.
Figure 4:
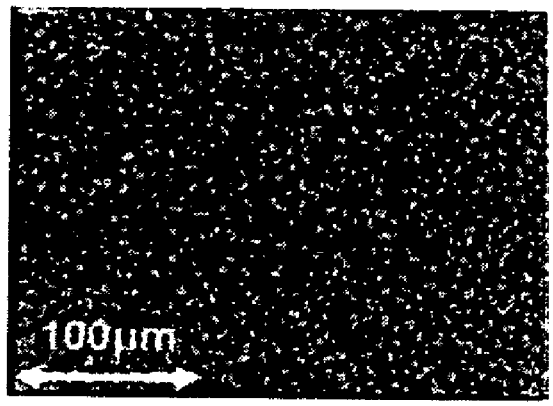
FIG. 4 shows phase separation morphologies of Twisted Nematic (TN) cells in an embodiment observed from a polarized optical microscope.

FIG. 3 to 4 show morphologies of the exemplary observed with conventional, TN, and homogeneous UV cured PDLC cells absorbed from a polarized optical microscope in a voltage-off state. UV exposure intensity was I=60 mW/cm$^2$ and the curing time was 15 mins at T=20□. FIG. 3 shows LC droplets in the conventional cells to be larger and less uniform than those observed in FIG. 4 for the TN cells.

Figure 5:
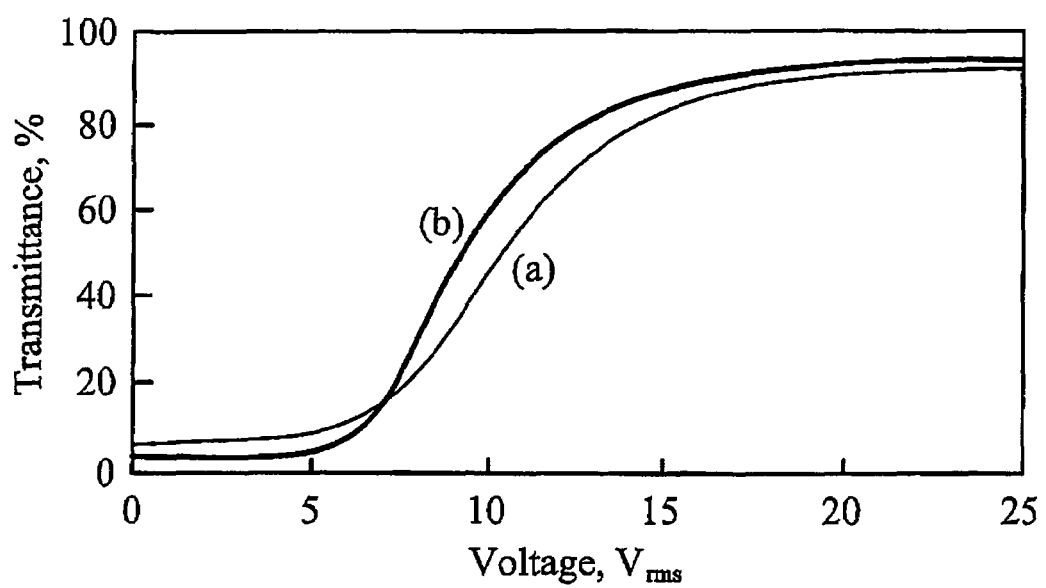
FIG. 5 is showing voltage-dependent transmittance of conventional PDLC cells (a) and PDLC TN cells of an embodiment (b).

FIG. 5 is showing voltage-dependent transmittance of conventional PDLC cells (a) and PDLC TN cells of the embodiment (b). In a low voltage regime, the PDLC TN cells of the embodiment (b) exhibits a better dark state than the conventional PDLC cells (a). A saturation voltage of both cells (a) and (b) occurs at about 20V$_{rms}$. Thus, comparing the contrast ratio at V=20 V$_{rms}$, the PDLC TN cells of the embodiment (b) exhibits a higher contrast ratio than the conventional PDLC cells (a). In the embodiment, the contrast ratio of the PDLC TN cells could be reached to 35:1.

Demonstrably, the rubbed PI surfaces have a crucial influence on the phase separation of PDLC when the cell gap is thin. The smaller and more uniform LC droplets exhibit a higher scattering efficiency which, in turn, leads to a higher device contrast ratio.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal device, comprising:
a pair of substrates with anchoring energy, wherein a cell gap is formed therebetween; and
polymer dispersed liquid crystal, arranged in the cell gap, wherein the liquid crystal device is under a condition that the anchoring energy is greater than $1\times10^{-6}$ J/m$^2$, the polymer dispersed liquid crystal has polymer concentration of about 20-40 wt %, and the cell gap is between about 2 μm and 50 μm, and the condition enhances phase separation of liquid crystals in the liquid crystal device to make droplets of the liquid crystals smaller and more uniform.

2. The liquid crystal device as claimed in claim 1, wherein the anchoring energy is provided by one or both inner surfaces of the pair of substrates, with strength of the anchoring energy on both of substrates the same or different.

3. The liquid crystal device as claimed in claim 2, wherein an alignment layer is formed on the one or both of inner surfaces of the pair of substrates for providing the anchoring energy.

4. The liquid crystal device as claimed in claim 3, wherein the alignment layer is formed by contact alignment treatment.

5. The liquid crystal device as claimed in claim 4, wherein the contact alignment treatment includes rubbing alignment.

6. The liquid crystal device as claimed in claim 3, wherein the alignment layer is formed by non-contact alignment treatment.

7. The liquid crystal device as claimed in claim 6, wherein the non-contact alignment treatment includes alignment of oxide evaporation, photo alignment, ion beam alignment, or plasma ion beam alignment.

8. The liquid crystal device as claimed in claim 1, wherein the polymer dispersed liquid crystal is formed by dispersing liquid crystal droplets in a polymer material and arranged in the cell gap separating the pair of substrates.

9. The liquid crystal device as claimed in claim 1, wherein the liquid crystal droplets are nematic liquid crystal, smectic liquid crystal, cholesteric liquid crystal, ferroelectric liquid crystal, or anti-ferroelectric liquid crystal.

10. The liquid crystal device as claimed in claim 1, wherein the liquid crystal droplets are positive liquid crystal or negative liquid crystal.

11. The liquid crystal device as claimed in claim 1, wherein the cell gap is between about 4 and 15 μm.

12. The liquid crystal device as claimed in claim 1, wherein the liquid crystal droplets has a size smaller than about 3 μm.

13. The liquid crystal device as claimed in claim 8, wherein the polymer dispersed liquid crystal further comprises dye material.

14. A reflective display device, comprising:
a pair of substrates with anchoring energy, comprising a lower flexible reflective substrate and an upper flexible transparent substrate, wherein a cell gap is formed therebetween; and
polymer dispersed liquid crystal, arranged in the cell gap, wherein the reflective display device is under a condition that the anchoring energy greater than $1\times10^{-6}$ J/m$^2$, the polymer dispersed liquid crystal has polymer concentration of about 20-40 wt %, and the cell gap is between about 2 μm and 50 μm, and the condition enhances phase separation of liquid crystals in the reflective display device to make droplets of the liquid crystals smaller and more uniform.

15. The reflective display device as claimed in claim 14, wherein an alignment layer is formed on the inner surface of the lower flexible reflective substrate or the upper flexible transparent substrate for providing the anchoring energy.

* * * * *